United States Patent [19]

van Gils et al.

[11] 3,991,027

[45] Nov. 9, 1976

[54] METHOD FOR BONDING POLYAMIDES TO RUBBER, ADHESIVE FOR THE SAME, AND ADHESIVE COATED POLYAMIDE REINFORCING ELEMENTS

[75] Inventors: Gerard E. van Gils, Tallmadge; Edward F. Kalafus, Akron, both of Ohio

[73] Assignee: The General Tire & Rubber Company, Akron, Ohio

[22] Filed: Dec. 9, 1974

[21] Appl. No.: 531,114

Related U.S. Application Data

[60] Division of Ser. No. 380,937, July 19, 1973, Pat. No. 3,888,805, which is a continuation-in-part of Ser. No. 310,524, Nov. 29, 1972, abandoned.

[52] U.S. Cl. ............................... 260/29.3; 156/334; 156/335; 260/845; 260/846; 260/857 D; 428/474; 428/506
[51] Int. Cl.[2] ................. C08L 61/10; C08L 61/12; C08L 61/14
[58] Field of Search .................... 260/29.3, 845, 846

[56] References Cited
UNITED STATES PATENTS 3,194,294   7/1965   van Gils ............................ 260/29.3
3,547,729   12/1970   Kibler ................................ 156/331

OTHER PUBLICATIONS

The Chemistry of Phenolic Resins, Martin, New York, John Wiley & Sons, 1956, p. 111.

*Primary Examiner*—John C. Bleutge

[57] ABSTRACT

An aqueous alkaline dispersion of a rubbery vinyl pyridine copolymer, trimethylol phenol, and a resorcinol compound, in certain amounts is useful in forming an adhesive for bonding polyamide or nylon cords to rubber compounds or stocks. After dipping the cord in the adhesive dip, the coated cord is heated to dry it and heat cure or heat set the adhesive on the cord. Thereafter, the adhesive containing cord is combined or laminated (calendered) with a curable rubber compound and the resulting assembly is cured. High H-adhesions are obtained with this one-step or single treatment coating dip. It is particularly useful for bonding crystalline polyamides having a large number of aromatic groups in the polymeric structure, e.g., "Fiber B."

8 Claims, No Drawings

3,991,027

METHOD FOR BONDING POLYAMIDES TO RUBBER, ADHESIVE FOR THE SAME, AND ADHESIVE COATED POLYAMIDE REINFORCING ELEMENTS

This application is a division of prior copending patent application Ser. No. 380,937 filed July 19, 1973, now U.S. Pat. No. 3,888,805 granted June 10, 1975 which was a continuation-in-part of prior copending patent application Ser. No. 310,524, filed Nov. 29, 1972, entitled "Method For Bonding Polyamides to Rubber, Adhesive For The Same, And Adhesive Coated Polyamide Reinforcing Elements," now abandoned.

OBJECTS

An object of the invention is to provide a one-step aqueous dip useful in providing an adhesive for bonding polyamide reinforcing elements to rubber compounds, e.g., for binding nylon tire cords to rubber to form carcass and belt plies for making tires. Another object is to provide polyamide reinforcing elements, e.g., such as those used in the belt and the carcass plies of tires, with a minor amount of an adhesive so that the adhesive containing elements may subsequently be bonded to rubber on curing and being characterized by exhibiting high adhesions. A further object is to provide a method for bonding polyamide, particularly aromatic polyamide, fibers, cords and so forth to rubber compounds using a single dip and the product of said method. These and other objects and advantages of the present invention will become more apparent to those skilled in the art from the following detailed description and working examples.

SUMMARY OF THE INVENTION

According to the present invention it has been discovered that a composition comprising essentially an aqueous alkali dispersion generally of 100 parts by weight of a rubbery vinyl pyridine copolymer, from about 2 to 28 parts by weight of trimethylol phenol, from about 0.5 to 24 parts by weight of a water soluble resorcinol compound selected from the group consisting of resorcinol or a resorcinol-formaldehyde non heat hardenable, water soluble and thermoplastic compound (a fusible novolak or novolak resin), from about 0 to 3 parts by weight of an alkaline material selected from the group consisting of $NH_3$ and $NaOH$, and from about 170 to 1100 parts by weight of water, is very useful as a treating, dipping or coating material for use in bonding polyamide reinforcing elements to rubber compounds. Sufficient alkaline material such as aqueous $NH_3$ or $NaOH$ is added to the dispersion (or to one or more of the ingredients of the dispersion before mixing them together) to obtain the desired pH, prevent coagulation of the latex and to provide for stabilization. This will vary with the acidity of the resorcinol or novolak and the pH of the latex, all of which may vary from batch to batch. Since the amount of each compound may vary, the amount of alkaline material required can also vary. After drying the adhesive on the polyamide element to remove water to heat cure or heat set the adhesive on the element, the adhesive containing element can then be combined or calendered with a curable rubber compound and the resulting assembly cured, usually in a mold, to provide a laminate exhibiting high adhesions. This dip is very effective for fibers such as Fiber B. Conventional dips for polyamide or nylon fibers do not give as high adhesions as do the dips of the present invention particularly with respect to Fiber B.

Moreover, the present method involves only one dipping step and the process or method can be varied to provide the desired pick-up or solids on the cord by varying the concentration of the dip or speed of cord through the dip to give the amount needed to develop the requisite adhesive bond. Thus, while the cord can be run through successive dips of the same or varying amounts of the above materials to get the desired buildup, this is unnecessary as satisfactory results can be accomplished in one dip. Pre or post dips of other adhesive compositions are unnecessary when using the present aqueous adhesive dip.

DISCUSSION OF DETAILS AND PREFERRED EMBODIMENTS

The polyamide, or nylon, reinforcing element of the present invention can be in the form of monofilament, fibers, yarn, tow, twisted yard, cord or fabric. The polyamide may be an aromatic polyamide, an aliphatic polyamide, or a polyamide containing both aliphatic and aromatic units. These long chain polymeric amides are capable of being formed into filaments and have recurring amide groups as an integral part of the main polymer chain. The polyamide ingredient can be a homopolymer, block or random copolymer, or a mixture of two or more of such polymers. The polyamide will usually have both crystalline and amorphous regions. Groups other than amide, respectively, may be present in minor amounts in these polymers, such groups including: carbonate, urea, urethane, ether, ketone, imidazole, oxazole, and other oxygen-containing moieties.

In general, these high molecular weight polyamides are obtained by reacting polyamines, such as the alpha, omega-diamines, like 1,6-hexamethylene diamine, 1,5-pentamethylene diamine and 1,8-octamethylene diamine, with polycarboxylic acids, such as adipic acid, succinic acid, phthalic acid, chlorophthalic acid and the like. The polyamides may also be prepared by polymerization of aminocarboxylic acids, such as aminocaproic acid. Polyamides from caprolactam and p-aminobenzoic acid also can be used.

The high molecular weight aromatic polyamides are obtained by condensation of metaphenylene diamines with isophthalic acid or paraphenylene diamines with terephthalic acids or m, p, or o-benzamides or mixtures of the above isomeric amines with isomeric acids. It is also possible to make polyamides using the above mentioned isomers with substituents on the phenyl groups, halogen (—Cl), alkyl ($CH_3$—), etc., or to use biphenyl acids with diamines or aromatic diamines and/or diacids in which the aromatic nuclei are spaced by:

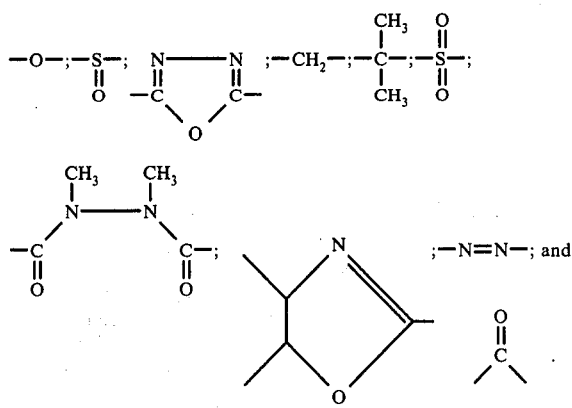

Instead of phenylene groups, the polymers can partly or totally contain heterocyclic rings.

Examples of such materials are polyhexamethylene adipamide, copolymers of metaphenylene diamine and terephthalic or isophthalic acid or acid chloride, poly[-bis-(4-amino-cyclohexyl)methanedodecamide], poly-para-phenylene terephthalamide from phenylene-diamine and terephthaloyl chloride, poly(hexamethylene terephthalamide), poly-m, or p-benzamide and the like. Examples of commercially available aliphatic polyamides are nylon 6 and nylon 66. Examples of aromatic polyamides are "Nomex" and "fiber B" (the "aromids" or "aramids").

Preferred are the linear or long chain synthetic aromatic polyamides in which at least 85% of the amide linkages are attached directly to aromatic rings, which are highly crystalline, and which have a modulus (grams/denier) of at least about 350.

Polyamides and methods for making them are well known as shown by U.S. Pat. Nos. 2,071,250; 2,071,253; 2,130,948; 2,241,321; 3,006,899; 3,094,511; 3,225,011; 3,232,910; 3,308,007; 3,464,878; 3,536,651; 3,629,053; 3,632,548; 3,660,361; and 3,673,143; Belgian Pat. No. 726,050; French Pat. No. 1,526,745; British Pat. No. 1,259,788; "Mechanics of Pneumatic Tires," Clark, National Bureau of Standards Monograph 122, U.S. Department of Commerce, issued November, 1971, pages 225 to 238; and "Rubber World," April, 1972, page 56. More information on polyamides, especially those for use in making fibers, can be found in "Encyclopedia of Polymer Science and Technology," Interscience Publishers division of John Wiley and Sons, Inc., New York, 1969, Volume 10, pages 347 to 460 and, more particularly with respect to high modulus fibers, in "Chem Tech," Preston, November, 1971, pages 664 to 671; "Americal Chem. Soc. Polym. Prepr.," Bach et at, 11(1), 334 (1970); "Journal of Polymer Science," Frazer et al, Part a, Volume 2, pages 1147 to 1169 (1964); and the "Federal Register," Volume 37, No. 120, June 21, 1972, pages 12243 and 12244.

The type of rubber latex used in the tire cord dip bath of this invention is a latex of a copolymer of a vinyl pyridine and conjugated diolefin having 4 to 6 carbon atoms. The rubber latex is of the type described in U.S. Pat. No. 2,561,215 and comprises an aqueous dispersion of a copolymer of 50 to 95 percent by weight of a conjugated diolefin having 4 to 6 carbon atoms, 5 to 40 percent of a vinyl pyridine and 0 to 40 percent of a styrene. Examples of suitable vinyl pyridines are 2-vinyl pyridine, 4-vinyl pyridine, 2-methyl-5-vinyl pyridine, and 5-ethyl-2-vinyl pyridine.

In practicing this invention, it is usually preferred to use a latex of a copolymer of from about 60 to 80% by weight butadiene-1,3,7 to 32% styrene and 5 to 22% of 2-vinyl pyridine. Excellent results are obtained using a latex of a terpolymer of about 70% by weight of butadiene-1,3, 15% styrene and 15% 2-vinyl pyridine having a total solids contants of around 30 to 50% by weight. Also blends of latices may be used such as a blend of a butadiene-1,3/2-vinyl pyridine rubbery copolymer latex and a butadiene-1,3/styrene rubbery copolymer latex or a blend of a butadiene-1,3/styrene/2-vinyl pyridine rubbery copolymer latex and a butadiene-1,3/styrene rubbery copolymer latex so long as the percent by weight ratio of total monomers in the copolymers is within the ranges as specified above. The pH of the latices should be similar and the surfactants and stabilizers should be compatible to avoid coagulation on blending or mixing of the latices. Further disclosures of rubbery vinyl pyridine copolymer latices may be found in U.S. Pat. Nos. 2,615,826 and 3,437,122.

The trimethylol phenol is prepared by the reaction of an excess of formaldehyde with phenol using a catalytic amount of base (NaOH) under nitrogen. The excess of $H_2CO$ drives the reaction to a high content of trimethylol phenol (2,4,6-trimethylol phenol) which is water soluble. The unreacted aldehyde can be removed by venting with reduced pressure. The base can be neutralized with acid to a pH of about 7. In preparing trimethylol phenol, after the first mol of formaldehyde was added to the phenol, the second and third additions are easier.

The resorcinol compound is resorcinol or a water soluble, thermoplastic and non-heat hardenable (without a curing agent or crosslinker) resorcinol-formaldehyde novolak or novolak resin or mixture thereof. The novolaks are prepared under acid conditions by the reaction of resorcinol and formaldehyde (or a formaldehyde donor like paraformaldehyde) to provide compounds having reactive phenolic hydroxy groups rather than methylol groups. The mol ratio of resorcinol to formaldehyde can vary over a considerable range to provide novolaks useful in the practice of the present invention although a preferred mol ratio of resorcinol to formaldehyde is about 1:0.5 to 2.0. These compounds and methods for making them are well known in the art.

Examples of commercially available resorcinol compounds are the water soluble novolak resins known as Arofene 779 (Ashland Chemical Co.) having a mol ratio of resorcinol to formaldehyde of about 1/0.62 and a commercially available novolak which comprises a mixture of about 15 parts by weight of resorcinol, 42.5 parts of diresorcinol methane (R/F/R) and 42.5 parts of a low molecular weight R/F novolak resin of a R/F mol ratio of about 3/2.

Since the resorcinol compound is acidic or prepared under acidic conditions, it should be neutralized or sufficient base such as $NH_4OH$ or NaOH added to it to prevent coagulation of the latex when the resorcinol compound is mixed with the latex. Even though the latex is alkaline, sufficient additional base may still be necessary to prevent such coagulation or premature coagulation and the consequent inability to use the dip properly.

Information on the preparation of the novolaks will be found in "Encyclopedia of Chemical Technology," Kirk-Othmer, Volume 15, Second Edition, 1968, Interscience Publishers Division of John Wiley & Sons, Inc., New York, pages 176 to 208; "Technology of Adhesives," Delmonte, Reinhold Publishing Corp., New York N.Y., 1947, pages 30 to 31; and "Formaldehyde," Walker, A.C.S. Monograph Series, Reinhold Publishing Corp., New York, N.Y., Third Edition, 1964, pages 336 to 339.

Water is used in an amount sufficient to provide for the desired dispersion of the rubber or latex particles, for the solution of the trimethylol phenol and resorcinol compound, to reduce viscosities, and for the proper solids content to get the necessary pick-up of solids on and penetration between the fibers of the cord.

Based on 100 parts by weight (dry weight) of the vinyl pyridine rubber copolymer, or blend of the same, the dip generally comprises the rubber, from about 2 to 28 parts by weight of the trimethylol phenol, from about 0.5 to 24 parts by weight of the resorcinol compound, from about 0 to 3.0 parts by weight of water soluble base such as $NH_3$ or NaOH to provide a pH of at least 7.0, and from about 170 to 1100 parts by weight of water.

In order to provide data for the tire cord adhesive of this invention, a standard single-cord H-pull test is employed to determine the static adhesion at room temperature and above of the adhesive-coated tire cord to rubber. All the data submitted herein including the examples which follow are based upon identical test conditions, and all test specimens are prepared and tested in the same way generally in accordance with ASTM Designation: D 2138-67.

In order to apply the latex adhesive to the cords in a reliable manner, the cords are fed through the adhesive dip bath while being maintained under a small predetermined tension and into a drying oven where they are stretched and dried under a predetermined tension (about 2% to prevent sagging). As the cords leave the oven they enter a cooling zone where they are air cooled before the tension is released. In each case the adhesive-coated cords leaving the dip are dried in the oven at from about 200° to 500° F. for from about 5–300 seconds while under some tension. The drying and/or curing of the adhesive treated cord may be accomplished in one or more ovens for different times, temperatures and tensions. The time the cord remains in the one-step adhesive dip is about a second or so or at least for a period of time sufficient to allow wetting of the cord and penetration of the fibers of the cord.

The single-cord H-pull test is then employed to determine the static adhesion of the dried adhesive coated synthetic fiber cords to rubber. In each case the rubber test speciments are made from the same standard type rubber composition using the following recipe:

| Material | Parts by Weight |
| --- | --- |
| Natural rubber | 46.64 |
| Butadiene-styrene rubbery copolymer, average 23.5% bound styrene (SBR-1500) | 38.5 |
| Polybutadiene (solution polymerized | 15.0 |

-continued

| Material | Parts by Weight |
| --- | --- |
| BD, about 93% cis-1,4, Raw Mooney ML-4 at 212° F. about 40–50) | |
| Carbon black, fast extrusion furnace | 45.0 |
| Hydrated silica (Hi-Sil 233, Pittsburgh Plate Glass) | 15.0 |
| BLE-25 antioxidant (a high temperature reaction product of diphenylamine and acetone, Naugatuck Chemical Division of Uniroyal) | 2.0 |
| Processing oil (a blend of highly aromatic petroleum fractions) | 5.0 |
| Zinc oxide | 3.0 |
| Stearic acid | 1.5 |
| Cohedur RL (a 1:1 mixture of resorcinol and Cohedur A (the pentamethyl ether of hexamethylol melamine) which is a colorless, viscous liquid which liberates formaldehyde on heating. Naftone, Inc.) | 4.7 |
| N-tert-butyl-2-benzothiazole-sulfenamide (Santocure NS, Monsanto Chemical Co.) | 1.2 |
| Sulfur | 3.0 |

In every case the cords to be tested are placed in parallel positions in a multiple-strand mold of the type described in the single-cord H-pull adhesion test ASTM designated D 2138-67, the mold is filled with unvulcanized rubber of the above composition, the cords being maintained under a tension of 50 grams each, and the rubber is cured 30 minutes at around 315° F. to the elastic state. Each rubber test specimen is ¼ inch thick and has a ⅜ inch cord embedment.

After the rubber has been cured, the hot reticulate cured rubber piece is removed from the mold, cooled and H-test specimens are cut from said piece, each specimen consisting of a single cord encased in rubber and having each end embedded in the center of a rubber tab or embedment having a length of around 1 inch or so. The specimens are then aged at least 16 hours at room temperature. The force required to separate the cord from the rubber is then determined at room temperature or 250° F. using an INSTRON tester provided with specimen grips. The maximum force in pounds required to separate the cord from the rubber is the H-adhesion value.

Cords or fabric coated with the adhesive of the present invention using the one-step or single dip of this invention can have from about 0.5 to 7% by weight (dry) solids of the adhesive dip on the cord based on the weight of the cord and can be used in the manufacture of carcasses, belts, flippers and chafers of radial, bias, or belted-bias passenger tires, truck tires, motorcycle and bicycle tires, off-the-road tires and airplane tires, and, also, in making transmission belts, v-belts, conveyor belts, hose, gaskets, rubbers, tarpaulins and the like.

The following examples will serve to illustrate the invention with more particularity to those skilled in the art. In these examples the parts are parts by weight unless otherwise indicated.

EXAMPLE I

CORD DIP COMPOSITIONS

| Material | A | B |
| --- | --- | --- |
| Vinyl pyridine rubber latex (1) | 100g. | 100g. |
| Trimethylol phenol (2) | 5g. | 10g. |
| Resorcinol-formaldehyde resin (3) | 5g. | 10g. |
| Concentrated ammonium hydroxide (28% $NH_3$ in $H_2O$) | 10 drops | 10 drops |

CORD DIP COMPOSITIONS-continued

| Material | A | B |
|---|---|---|
| Water | 50g. | 50g. |

Notes:
(1) Aqueous alkaline (about pH 10.5 – 10.7) dispersion of a terpolymer of 70 parts by weight of butadiene-1,3, 15 parts of styrene and 15 parts of 2-vinyl pyridine, 41% by weight total solids (about 38% by weight rubber solids, balance surfactant, stabilizer, etc.).
(2) 60% total solids in $H_2O$, Union Carbide Bakelite BRL-1031.
(3) 50% total solids in $H_2O$, preformed water-soluble resorcinol-formaldehyde novolak resin, Koppers Co., Inc., Penacolite R-2170.

Part of the water was used to dilute the viscous trimethylol phenol and another part after the addition of the ammonium hydroxide was used to dilute the resorcinol-formaldehyde resin. Thereafter the diluted solutions were mixed with the vinyl pyridine latex.

Polyamide tire cords (4) were then dipped in the foregoing dips and were heat treated under stretch (about 2%) at 450° F. for 90 seconds in air, laminated with the standard type rubber stock described supra, and molded, and the resulting assembly was cured for 30 minutes at 315° F. After curing, the assembly was removed from the mold, cooled and tested according to the H-adhesion test described supra. The following H-adhesions were obtained for the cords treated as described above. Dip A: 63 lbs. and Dip B: 67 lbs.

4. du Pont Fiber B (1500/3), a long chain synthetic aromatic polyamide (poly-p-phenylene terephthalamide) in which at least 85% of the amide linkages are attached directly to aromatic rings, which is highly crystalline, and which has a denier of 4500, a breaking strength of 180 lbs., a tenacity of 18 grams/denier, an elongation at break of 4%, a modulus of 350 grams/denier, a loop tenacity of 8.0 grams/denier, a growth and creep of 0.49% (lgpd, 30 minutes, 75° F.), and a 160° C. shrinkage of 0%.

Instead of preparing the tire cord adhesive as described earlier in this example, the dip can be prepared as follows: add the concentrated ammonia to the water, then dissolve the resorcinol-formaldehyde resin (dry form) in the water-$NH_3$ mix, next add the vinyl pyridine latex (41% solids), and finally add the trimethylol phenol (as 30% solids in $H_2O$).

EXAMPLE II

The method of this example was the same as that of Example I, above, except that the cords were dipped only in Dip B. The dipped and dried cords were then cured and tested in the same type rubber stock and also in the same type rubber stock which omitted the Cohedur RL. H-adhesion tests were run on the cured samples and the results are shown below in Table I.

TABLE I

H-Adhesions in Different Compounds and Different Temperatures

| Stock | H at RT* | H at 250° F. |
|---|---|---|
| Same as Example I | 70 lbs. | 54 lbs. |
| Same as Example I without Cohedur RL | 66 lbs. | 50 lbs. |

*Room temperature, about 25° C.

EXAMPLE III

The method of this example was the same as that of Example I, above, except that Dip B was diluted with more water to lower the total solids (T.S.) content of the dip. After curing in the same type rubber stock, H-adhesion tests were run and the results of the tests are shown below in Table II.

TABLE II

Influence of TS on the H-Adhesion

| TS in % (by weight of aqueous dispersion) | RT adhesion | 250° F. adhesion |
|---|---|---|
| 17½ | 68 lbs. | 52 lbs. |
| 15 | 68 lbs. | 58 lbs. |
| 13 | 70 lbs. | 60 lbs. |

EXAMPLE IV

The method of this example was the same as that of Example I, B above, except for variations in concentrations of the water as shown below:

| Composition of Dip | |
|---|---|
| Vinyl pyridine latex (41% total solids) | 100g. |
| Trimethylol phenol (60% total solids in $H_2O$) | 10g. |
| Resorcinol-formaldehyde novolak resin (50% total solids in $H_2O$) | 10g. |
| Concentrated Ammonia (28–30% in $H_2O$) | 10 drops |
| Water | variable |

At intervals of time (aging), the polyamide cord was dipped in dips of different total solids by dilution with water, heat treated at 450° F. for 90 seconds and cured into the same type of standard stocks. The following H-adhesions were obtained after testing:

TABLE III

SHELF AGING OF DIPS

| Dip Age | Dip Solids: (by weight) | H-Adhesion at RT and 250° F. | | |
|---|---|---|---|---|
| | | 17.5% | 15% | 13% |
| One day | | 68 lbs. | 68 lbs. | 70 lbs. |
| | | (52) lbs. | (58) lbs. | (60) lbs. |
| Three days | | 62 lbs. | 62 lbs. | 62 lbs. |
| | | (44) lbs. | (45) lbs. | (45) lbs. |
| Seven days | | 69 lbs. | 70 lbs. | 68 lbs. |
| Fifteen days | | 64 lbs. | 66 lbs. | 65 lbs. |
| Four weeks | | 67 lbs. | 70 lbs. | 67 lbs. |
| | | (41) lbs. | (48) lbs. | (50) lbs. |

H-adhesion in lbs. Hot adhesions indicated by ( ).
RT-room temperature, about 25° C.

The results of these tests show that the dips of the present invention have a shelf-life of at least 4 weeks.

EXAMPLE V

The method of this Example was the same as that of Example IV, above, and also of Example I, B, above, except that the resorcinol-formaldehyde resin used was replaced with other resorcinol compounds in varying amounts. The concentration (dry solids or weight) of the resorcinol compound is used in Table IV, below, rather than the weight of the resin solution. The compounds used and the H-adhesion test results are shown below:

TABLE IV

| Resorcinol Compound | Parts* | H-Adhesion, lbs, RT |
|---|---|---|
| Arofene 7209 (10) | 6 g. | 67 |
| E032702-22.2 (11) | 7.5 g. | 66 |
| Arofene 779 (12) | 2.5 g. | 70 |
| Arofene 6714 (13) | 2.5 g. | 67 |
| Resorcinol | 2.5 g. | 62 |
| Resorcinol-formaldehyde compound (Novolak) (R/F = 2/1) * | 5 g. | 64 |
| Resorcinol-formaldehyde compound (Novolak) (R/F = 1/1) * | 5 g. | 70 |
| Resorcinol-formaldehyde compound (Novolak) (R/F = 2/3) * | 5 g. | 64 |
| Resorcinol-formaldehyde compound (Novolak) (R/F = 3/5) * | 5 g. | 66 |

Notes:
*-grams (dry weight of the resin) per 100 parts by weight of the vinyl pyridine latex (41% T.S.)
* - mols or resorcinol to formaldehyde
(10) Ashland Chemical Co. resorcinol-formaldehyde compound convertible novolak resin.
(11) Same as (10) R:F mol ratio of about 1:1.6.
(12) Same as (10), viscosity of 2500–4000 cps. at 25° C., specific gravity of 1.25–1.27 at 25° C./25° C., pH of 1.5–3.5 at 25° C., and percent solids of about 74–76.
(13) Same as (10), viscosity of 1100–1400 cps. at 25° C., specific gravity of 1.23–1.26 at 25° C./25° C., pH of 1.0–3.0 at 25° C., and percent solids of 72–76.

EXAMPLE VI

A concentrated tire cord dip was first prepared by adding to 100 parts of a 41% (by weight total solids) vinyl pyridine latex first 15 parts of a 30% trimethylol phenol solution (BRL 1031) and then 5 parts of a 50% total solids aqueous resorcinol-formaldehyde novolak solution (Penacolite R 2170) which was first made alkaline with a few drops of concentrated ammonia. The viscosity of the resulting aqueous dip (40% TS), which was initially 12 centipoises (cp), increased to 20 cp after 20 days and to 24.5 cp after 31 days.

The adhesive properties of the dip were tested by taking a sample of the dip, diluting it with 200 parts of water to 15% by weight total solids and using it as a cord dip for Fiber B. The freshly prepared dip showed an H-adhesion of 71 lbs. at RT. After 10 days, the H-adhesion was 69 lbs. at RT, and after 34 days, it was 68 lbs. at RT.

In this example, except where noted, the chemical compounds, the cord used, and the processing and testing procedures were the same as in Example I, above.

EXAMPLE VII

The method of this Example was the same as that of Example I, above, except that in the dips containing the vinyl pyridine latex either the resorcinol-formaldehyde resin or the trimethylol phenol was omitted from the dip composition. The H-adhesions obtained are shown below:

| Material | Parts by Weight, g. | H-Adhesions, 25° C. |
|---|---|---|
| Aqueous Solution of Trimethylol phenol, no R-F resin | 1.5* | 42 lbs. |
| " | 3.0* | 43 lbs. |
| " | 4.5* | 44 lbs. |
| " | 6.0* | 45 lbs. |
| Aqueous solution of precondensed, resorcinol-formaldehyde novolak resin, no TMP | 7.5* | 52 lbs. |
| " | 6.0* | 55 lbs. |

*Dry weight of TMP or R-F resin and based on 100 g. of the (41% T.S.) vinyl pyridine rubber latex.

These results show that omission of either the resorcinol-formaldehyde resin (or the resorcinol compound) or of the trimethylol phenol from the dip containing the vinyl pyridine latex results in a substantial loss of H-adhesion.

Also, in this example the pulled-out cords from the H-adhesion test were light colored which means that the failure occurred mainly between the cord and the rubber stock (standard type). On the other hand with the dips of the present invention the pulled-out cords from the H-adhesion test are black, rubber covered indicating that failure occurred in the rubber phase (standard type stock).

EXAMPLE VIII

It is possible to use a styrene-butadiene latex (for instance SBR 2000) to substitute for part of the vinyl pyridine latex as is shown in the following dip compositions:

| Dip Compositions | Parts Dip A | Parts Dip B |
|---|---|---|
| Vinyl pyridine latex (TS 41% by weight) | 80 | 50 |
| SBR 2000 (copolymer of about 54% BDN and 46% STY, hot emulsion polymerized latex, 42% by weight T.S., about 39.5% rubber solids, balance surfactant, stabilizer, etc., pH about 10.5–11.5) | 20 | 50 |
| Trimethylol phenol 30% T.S. in water (BRL 1031) | 15 | 15 |
| Resorcinol novolak 50% T.S. in water (Penacolite R 2170) (made alkaline with ammonia) | 5 | 5 |
| Water | 110 | 110 |
| H-adhesion in lbs. (RT) | 65 | 64 |

The cord and chemicals used (except for the SBR 2000) and the processing and testing procedures employed were the same as in Example I, above.

EXAMPLE IX

The method of this example used the 15% total solids cord dip of Example IV, above. The cords were dipped, dried, and cured into the standard rubber stock and tested as shown in Example I, above. The cords used were nylon tire cord in one case and Dacron tire cord in the other case.

| | H-Adhesion, 25° C. |
|---|---|
| Nylon 66, 840 denier (840/2/2, du Pont) | 63 lbs. |
| Dacron (1300/3, polyethylene terephthalate, du Pont) | 11 lbs. |

These results show that the dips of the present invention can be used for other polyamide fabrics but are not satisfactory for polyester tire cord fabric.

EXAMPLE X

An aqueous alkaline dip, about 40% total solids, of 75% by weight of the vinyl pyridine latex and 25% by weight of the SBR 2000 latex was mixed with various amounts of BRL 1031 and Penacolite R 2170. See Example I, above. The viscosities of the dips were observed over a period of time. After 30 days, the dips were diluted with water to 15% total solids and used for dipping the above Fiber B (1500/3) cords. The dipped cords were then dried under tension at 450° F. for 90 seconds and embedded in the standard rubber stock as shown in Example I, supra, and cured. On testing the cured rubber embedded cords, the cords exhibited H-adhesions at room temperature of 63 to 66 pounds. Dry aging of the cured rubber embedded cords (300° F. for 24 hours under nitrogen in a sealed container) reduced the H-adhesions at room temperature about 3 pounds. Wet aging of the cured rubber embedded cords (300° F. for 24 hours in water under nitrogen in a sealed container) reduced the H-adhesions at room temperature to 45–48 pounds.

TABLE V

| | | Change of Viscosity with Time | | | |
|---|---|---|---|---|---|
| | Parts by wt. (dry) of BRL 1031 per 100 parts by wt. (dry) of Rubber blend | Parts by wt. (dry) of Penacolite R 2170 per 100 parts by wt. (dry) of rubber blend | Viscosity, cp after: | | | |
| | | | 1 day | 10 days | 21 days | 30 days |
| A | 6.5 | 6.0 | 10.0 | 10.0 | 10.5 | 11.5 |
| B | 7.5 | 5.0 | 10.0 | 11.5 | 11.5 | 11.5 |
| C | 8.4 | 4.0 | 11.0 | 12.0 | 12.0 | 12.0 |
| D | 9.45 | 3.0 | 11.5 | 12.0 | 12.0 | 12.0 | cp: centipoise

EXAMPLE XI

The method of this example was similar to that of Example X, above. First, mixtures of the latex blend and various amounts of BRL 1031 were prepared. After aging for 11 days, neutralized Penacolite R 2170 was added to provide a total solids of about 40% for the aqueous alkaline dispersion dip. The dips were then diluted with water to provide 15% solids dips. Fiber B (1500/3) cords were then dipped in these 15% T.S. dips, dried and vulcanized in the standard rubber stock as shown in Example X, above. The results on testing are shown below:

TABLE VI

| Delayed Addition of Penacolite R 2170 On Adhesions | | | |
|---|---|---|---|
| Parts by wt. (dry) of BRL 1031 per 100 parts by wt. (dry) of rubber blend | Parts by wt. (dry) of Penacolite R 2170 per 100 parts by wt. (dry) of rubber blend | H-Adhesions, lbs. | |
| | | RT | 250° F. |
| 9.6 | 7.5 | 60.7 | 35.6 |
| 12.6 | 7.5 | 59.0 | 35.3 |
| 15.9 | 7.5 | 59.5 | 37.3 |
| 18.9 | 7.5 | 62.0 | 37.9 |
| 14.4 | 10.0 | 58.9 | 39.7 |
| 17.1 | 13.6 | 57.3 | 36.9 |

EXAMPLE XII

The methods of this example were similar to those of Examples X and XI, above: the aqueous alkaline dip contained 15% total solids; the same latex blend was used; and 15 parts by wt. (dry) of BRL 1031 were used per 100 parts by wt. (dry) of the rubber blend. Different levels of alkaline Penacolite R 2170 (dry weight per 100 parts dry rubber) and resorcinol were used. The dips were aged prior to dipping the Fiber B (1500/3) cords; and the processing, drying, rubber embedment, curing and testing of the cords is the same as for said Examples.

TABLE VII

| H-Adhesions After Aging Dips | |
|---|---|
| Resin Component | H-Adhesion, lbs. RT |
| Penacolite R 2170, 0.625 phr, (A) | 63 |
| Penacolite R 2170, 1.25 phr, (B) | 70 |
| Penacolite R 2170, 1.56 phr, (B) | 68 |
| Resorcinol, 1.25 phr, (B) | 65 |
| Resorcinol, 1.56 phr, (B) | 64 |

(A) Dip aged 5 hours at 50° C., viscosity 14 to 15 cp.
(B) Dip aged 4 hours at 50°C., no measurable viscosity change

EXAMPLE XIII

An aqueous alkaline dispersion or emulsion dip was prepared as shown by Example I, above, containing 100 parts by weight (dry) of the vinyl pyridine rubber, 9.8 parts by weight of the resorcinol-formaldehyde novolak resin (Penacolite R 2170), 0.7 part of $NH_4OH$, 17.6 parts of trimethylol phenol (BRL 1031) and 673 parts of water. Fiber B cords (1500/3) were passed through the dip and dried in a first oven under 7 pounds tension at 350° F. for 120 seconds. The cords were next passed through a second oven under 15 pounds tension at 475° F. for 90 seconds. Part of the cords were then embedded in the rubber stock and cured. The results on testing as in Example I, above, were as follows:

H-adhesion at RT was 57.6 lbs.

Modulus was 439 grams/denier.

Test on dried adhesive containing cord — no rubber embedment. Test was ASTM Part 24, D885-21, as modified (the initial modulus of the dipped and dried cord is calculated in the 3 to 4 g/d portion of the load vs. elongation curve rather than at 10% elongation because Fiber B breaks at about 5% elongation).

Breaking strength was 192 lbs. Test was ASTM Part 24, D885-15 on dried adhesive containing cord — no rubber embedment.

Repeating the method of this example with average temperatures of 300°–350° F. in the first oven at Fiber B (1500/3) cord tensions of 1, 4 and 7 pounds, the moduli obtained were 389, 425, and 413 g/d (Av. 409) and the breaking strengths obtained were 202, 202 and 193 pounds (Av. 199), respectively. Similarly, with average Fiber B (1500/3) cord tensions of 1–7 pounds on the cord in the first oven at first oven temperatures of 300° and 350° F., the moduli obtained were 389 and 428 g/d (Av. 409) and the breaking strengths obtained were 198 and 201 pounds (Av. 199), respectively. The average room temperature H-adhesion for these runs was 54 pounds.

For comparative purposes a 2-dip system was used. The first dip comprised an aqueous alkaline dispersion (about 13% solids) of Aerosol OT (a surfactant), 2-vinyl pyrrolidone, an epoxide (water soluble epoxide derivative of glycerol having an epoxide equivalent of 150–170 and a viscosity of 120–200 centipoises) and NaOH. The second dip comprised an aqueous alkaline dispersion (about 22% solids) of about 100 pbw of the above vinyl pyridine rubber, 0.3 phr of a defoamer, 3.2 phr of $NH_4OH$ and 17.3 phr of a NaOH catalyzed resorcinol-formaldehyde (11/6 pbw ratio) resin. The Fiber B (1500/3) cords were dipped in the first dip and then at a tension of 1–7 pounds dried at 300°–350° F. for 120 seconds in a first oven after which they were dried further at 475° F. for 45 econds under a tension of 15 pounds. Next, the dried and dipped cords were dipped in the second dip and dried at 475° F. for 45 seconds at a tension of 15 pounds. On testing the following results were obtained:

H-adhesions, room temperature: 63–65 pounds, average 64 pounds.

Moduli: 328–356, average 338 g/d.

Breaking strength: 188–195, average 191 pounds.

The increased moduli of the dipped cords of the present invention may lead to better tread wear when they are used in the belts of radial or bias-belted tires.

While in the foregoing examples, the adhesive containing polyamide reinforcing elements can be adhered to a vulcanizable blend of natural rubber, polybutadiene rubber, and rubbery butadiene-styrene copolymer by curing the same in combination together, it is apparent that said heat cured adhesive containing polyamide reinforcing element can be adhered to other vulcanizable rubbery materials, by curing or vulcanizing the same in combination with the rubber, such as one or more of the foregoing rubbers as well as nitrile rubbers, chloroprene rubbers, polyisoprenes, vinyl pyridine rubbers, acrylic rubbers, isoprene-acrylonitrile rubbers and the like and mixtures of the same. These rubbers can be mixed with the usual compounding ingredients including sulfur, stearic acid, zinc oxide, magnesium oxide, accelerators, antioxidants and other curatives, rubber compounding ingredients and the like well known to those skilled in the art for the particular rubbers being employed.

What is claimed is:

1. A composition of matter useful in adhering a polyamide reinforcing element to a rubber compound comprising essentially an aqueous alkaline dispersion of 100 parts by weight of a rubbery vinyl pyridine copolymer, from about 2 to 28 parts by weight of trimethylol phenol, from about 0.5 to 24 parts by weight of at least one water soluble, thermoplastic and non heat hardenable resorcinol compound selected from the group consisting of resorcinol and a resorcinol-formaldehyde novolak, from about 0 to 3 parts by weight of alkaline material selected from the group consisting of $NH_3$ and NaOH, and from about 170 to 1100 parts by weight of water.

2. A composition according to claim 1 where said rubbery vinyl pyridine copolymer is a copolymer of from about 60 to 80% by weight of butadiene-1,3, from about 7 to 32% by weight of styrene, and from about 5 to 22% by weight of 2-vinyl pyridine and where said resorcinol compound is made by reacting resorcinol with formaldehyde in the mol ratio of about 1:0.5 to 2.

3. A composition according to claim 2 where said copolymer is a blend of a terpolymer of butadiene-1,3, styrene and 2-vinyl pyridine and a copolymer of butadiene-1,3 and styrene.

4. A composition according to claim 1 where said rubbery vinyl pyridine copolymer is a copolymer of from about 60 to 80% by weight of butadiene-1,3, from about 7 to 32% by weight of styrene, and from about 5 to 22% by weight of 2-vinyl pyridine.

5. A composition according to claim 4 where said rubbery vinyl pyridine copolymer is a copolymer of about 70% by weight of butadiene-1,3, 15% by weight of styrene, and 15% by weight of 2-vinyl pyridine.

6. A composition according to claim 1 where said resorcinol compound is resorcinol.

7. A composition according to claim 1 where said resorcinol compound is a resorcinol-formaldehyde novolak.

8. A composition according to claim 7 where said resorcinol compound is made by reacting resorcinol with formaldehyde in the mol ratio of about 1:0.5 to 2.

* * * * *